(12) United States Patent
Czornyj

(10) Patent No.: US 8,267,292 B2
(45) Date of Patent: Sep. 18, 2012

(54) LOAD CARRIER FOR VEHICLE ROOF

(75) Inventor: Taras Czornyj, Göteborg (SE)

(73) Assignee: GM Global Technology Operations LLC, Detroit, MI (US)

( * ) Notice: Subject to any disclaimer, the term of this patent is extended or adjusted under 35 U.S.C. 154(b) by 970 days.

(21) Appl. No.: 11/445,196

(22) Filed: Jun. 2, 2006

(65) Prior Publication Data

US 2007/0080185 A1    Apr. 12, 2007

(30) Foreign Application Priority Data

Jun. 3, 2005  (SE) .................................. 0501269

(51) Int. Cl.
*B60R 9/042* (2006.01)
(52) U.S. Cl. ......... 224/310; 224/325; 224/327; 224/315
(58) Field of Classification Search .................. 224/310, 224/325, 326, 327, 556, 315; 414/462
See application file for complete search history.

(56) References Cited

U.S. PATENT DOCUMENTS

| | | | | |
|---|---|---|---|---|
| 3,963,136 | A | * | 6/1976 | Spanke ........................ 414/462 |
| 5,417,358 | A | * | 5/1995 | Haselgrove .................. 224/310 |
| 5,544,796 | A | * | 8/1996 | Dubach ........................ 224/310 |
| 5,782,391 | A | * | 7/1998 | Cretcher ....................... 224/310 |
| 6,015,074 | A | * | 1/2000 | Snavely et al. ............... 224/310 |
| 6,158,638 | A | * | 12/2000 | Szigeti ......................... 224/310 |
| 6,681,970 | B2 | * | 1/2004 | Byrnes ......................... 224/310 |
| 6,827,244 | B1 | | 12/2004 | Stapleton et al. |
| 6,845,892 | B2 | * | 1/2005 | Henderson ................... 224/316 |
| 2004/0028510 | A1 | | 2/2004 | Jones |

FOREIGN PATENT DOCUMENTS

| | | | |
|---|---|---|---|
| CA | 2198294 | A * | 8/1997 |
| DE | 3318891 | A1 * | 11/1984 |
| DE | 8914121 | | 3/1990 |
| DE | 29602977 | | 5/1996 |
| DE | 19543218 | A1 * | 1/1997 |
| DE | 19930004 | | 1/2001 |
| DE | 10234572 | A1 * | 2/2004 |

OTHER PUBLICATIONS

International-Type Search Report (PCT/ISA/201/SE).

* cited by examiner

*Primary Examiner* — Justin Larson
*Assistant Examiner* — Steven M Landolfi, Jr.
(74) *Attorney, Agent, or Firm* — Harness, Dickey & Pierce, P.L.C.

(57) ABSTRACT

A load carrier for a vehicle roof is disclosed. The load carrier includes at least one load profile which, in use, extends along the vehicle roof. The load profile has a first part and a second part which are movable relative to each other in their longitudinal direction. The first part that in use is positioned next to the vehicle roof having at the top an undercut groove which extends in the longitudinal direction of the first part and in which engages, in a longitudinally displaceable manner, at least one slideway belonging to the second part and having a shape matching the undercut groove.

24 Claims, 5 Drawing Sheets

LOAD CARRIER FOR VEHICLE ROOF

FIELD OF THE INVENTION

The present invention relates to a load carrier for a vehicle roof, comprising at least one load profile which in use extends along the vehicle roof and has a first part and a second part which are movable relative to each other in their longitudinal direction.

BACKGROUND ART

When transporting a load on a vehicle and especially on a vehicle roof, a load carrier is suitably mounted to carry the load. Such load carriers are previously known in the form of, for instance, roof racks and are available in different designs. Roof racks of a traditional type are mounted on the vehicle roof, for instance, on the drip molding of the vehicle. An inconvenience of such roof racks is that it is difficult to load and unload cargo. An attempt to eliminate this inconvenience is to design the roof rack so that parts thereof can be pulled out sideways or backwards relative to the direction of travel of the car and be lowered so as to improve accessibility. Prior-art roof racks which have this function are, however, often complicated and bulky and catch a great deal of wind, among other things because a large number of parts are required for the interconnection of the movable parts. A large number of parts may have negative consequences from an economic perspective since, for instance, the cost of manufacture will be higher by the parts themselves constituting a cost and by the fact that they must be assembled. Furthermore this type of construction may imply that the roof rack will have a greater weight, which is negative since it will be heavier work for the user, for instance, to fit and remove the roof rack. This may in turn result in the user hesitating to mount the roof rack at all. In addition, this construction may cause greater wear and require replacement or mending of parts.

As mentioned above, it may be an inconvenience of prior-art roof racks that they are bulky. From an aerodynamic perspective, this usually results in a lower mileage and a higher noise level. These two effects may further add to the user deciding not to use his roof rack to the extent that would otherwise occur. Noise also disturbs the vehicle driver and may make him exhausted, which during long trips may increase the risk of an accident. Since roof racks are often bulky, they can also make it difficult for the vehicle to pass through low openings, such as garage doors or gates to an inner yard. Especially if a high load is placed on the roof rack, the point of gravity of the vehicle may also be raised, which again may increase the risk of an accident.

The object of the invention is to at least partly eliminate the above inconveniences.

SUMMARY OF THE INVENTION

The present invention is a load carrier for a vehicle roof, comprising at least one load profile which in use extends along the vehicle roof and has a first part and a second part which are movable relative to each other in their longitudinal direction, the first part that in use is positioned next to the vehicle roof having at the top an undercut groove which extends in the longitudinal direction of the first part and in which engages, in a longitudinally displaceable manner, at least one slideway belonging to the second part and having a shape matching the undercut groove. Thus a compact load carrier with few parts is provided, which makes it simple and easy to handle. An additional advantage which thus is achieved is an increased possibility of an esthetically attractive and aerodynamic design since the load carrier can be more adjusted to the overall design of the car. This is highly advantageous since design is an important aspect in the vehicle trade. In addition to the possibility of letting the design of the load carrier adopt the language of design of the vehicle, the load carrier can also be adjusted in terms of shape with respect to good aerodynamics and a noise-reducing design. There will also be a smaller risk of breakdown since the technical solution is simpler and since there is a smaller number of parts that can break. It will also be possible to achieve lower costs of manufacture due to the simple construction of the load carrier. For the user this also means that the load carrier will be easy to mount on the vehicle thanks to the low weight of the load carrier, which at the same time additionally promotes, not only the possibility of the aerodynamic design, but also a higher mileage of the vehicle. At the same time it will still be possible, like in prior-art load carriers, to pull out the second part outside the vehicle roof so that a load can easily be placed on the load carrier and fixed thereto.

In one embodiment, the longitudinal extent of the load profile is transverse to the vehicle roof. This gives the advantage that the load can then be arranged in the longitudinal direction of the vehicle, which is aerodynamically favorable.

In one embodiment, said second part is a slide adapted to the cross-sectional shape of the groove in said first part. Since the second part is thus in contact with the first part at several points, lower friction is obtained at each point, and consequently the load carrier is subjected to less wear, which is very advantageous.

In one embodiment, said second part is completely extensible from said first part, which gives the advantage that the second part can be replaced by a differently designed second part which is convenient for the user and the load. This increases the applicability of the load carrier.

In one embodiment, said second part is a cover profile. On the occasions when the user does not intend to use the load carrier, it may be desirable to cover the undercut groove with a cover profile. The advantage thus achieved is a considerable reduction of dirt and similar disturbing elements collected in the undercut groove.

In one embodiment, said first part is arranged to be permanently connected to the vehicle roof. When the load carrier is mounted on the vehicle roof, the first part thus permanently remains on the vehicle roof and the vehicle can, for instance, be delivered with the first part mounted. By permanent is in the sense of the patent meant that the first part is mounted on the vehicle in such a manner that the user cannot without difficulties or great modification remove it from the vehicle.

In one embodiment, said first part is integrated with the vehicle roof. By way of suggestion, the load carrier can be integrated with the vehicle roof in the manufacture of the vehicle. Said first part may consist of, for instance, parts of the actual vehicle roof and, thus, a color and shape fully adjusted to the roof of the vehicle can be obtained, which is positive from the viewpoint of design. By integrated is meant in the sense of the patent that the first part of the load carrier is combined with the roof, that is the first part is an integral part of the roof, for instance as a fold in the roof metal sheet or welded to the roof.

In one embodiment, the track formed by the groove and intended for said first and second part has an arc-shaped curve with a radius of curvature bent downwards from the arc. The advantage achieved in this embodiment is that when the user moves said second part along the extent of the load carrier, for instance when loading an object, the second part follows the radius of curvature of the first part, which means that the second part is simultaneously moved vertically downwards to the ground. Thus two position movements are achieved in the same movement, which results in much simpler and smoother loading and unloading of cargo. Moreover this embodiment gives the advantage that the load carrier can be designed so that it follows the shape of the vehicle roof. This is again important from the viewpoint of design since the designer can form the load carrier to be esthetically designed for each vehicle model.

In one embodiment, the track formed by the groove and intended for said first and second part has a circular arc curve with a radius of curvature bent downwards from the arc. The advantage achieved in this embodiment is that the load profile will have a constant radius of curvature. As a result, the second part follows the first part at each point, thus minimizing play and tension between the two parts.

In one embodiment, said second part is made of a flexible material and, thus, its curve is adjustable to the curved shape of said first part. The advantage achieved in this embodiment is that the second part can be adjusted in terms of shape to said first part, which thus can follow the shape of the vehicle roof independently of the radius of curvature.

In one embodiment, the vertically upper side of the load profile substantially follows the roof profile. In this way, the distance between the upper surface of the load profile and the roof profile is constant at each point. This embodiment results in a smooth and aerodynamic load carrier whose design adopts the overall design of the vehicle.

In one embodiment, the vertically upper side of the load profile substantially coincides with the roof profile. The advantage achieved in this embodiment is that the load profile and the vehicle roof adopt the same language of design, which gives design advantages, such as an esthetically attractive and aerodynamic roof rack.

In one embodiment, said part is in its vertically upper side provided with fastening means for fastening components adjusted to the current roof load. When transporting cargo on the roof rack, a fastening device is required on said second part. When the fastening device is connected directly to the second part, it will be very easy for the user to fasten the cargo. In addition, the user can adjust the choice of fastening device to the type of cargo that is to be fastened.

In one embodiment, the load carrier comprises two load profiles.

BRIEF DESCRIPTION OF THE DRAWINGS

The invention will now be described in more detail with reference to the accompanying drawings which by way of example illustrate currently preferred embodiments of the invention.

DESCRIPTION OF A PREFERRED EMBODIMENT

Figure 1:
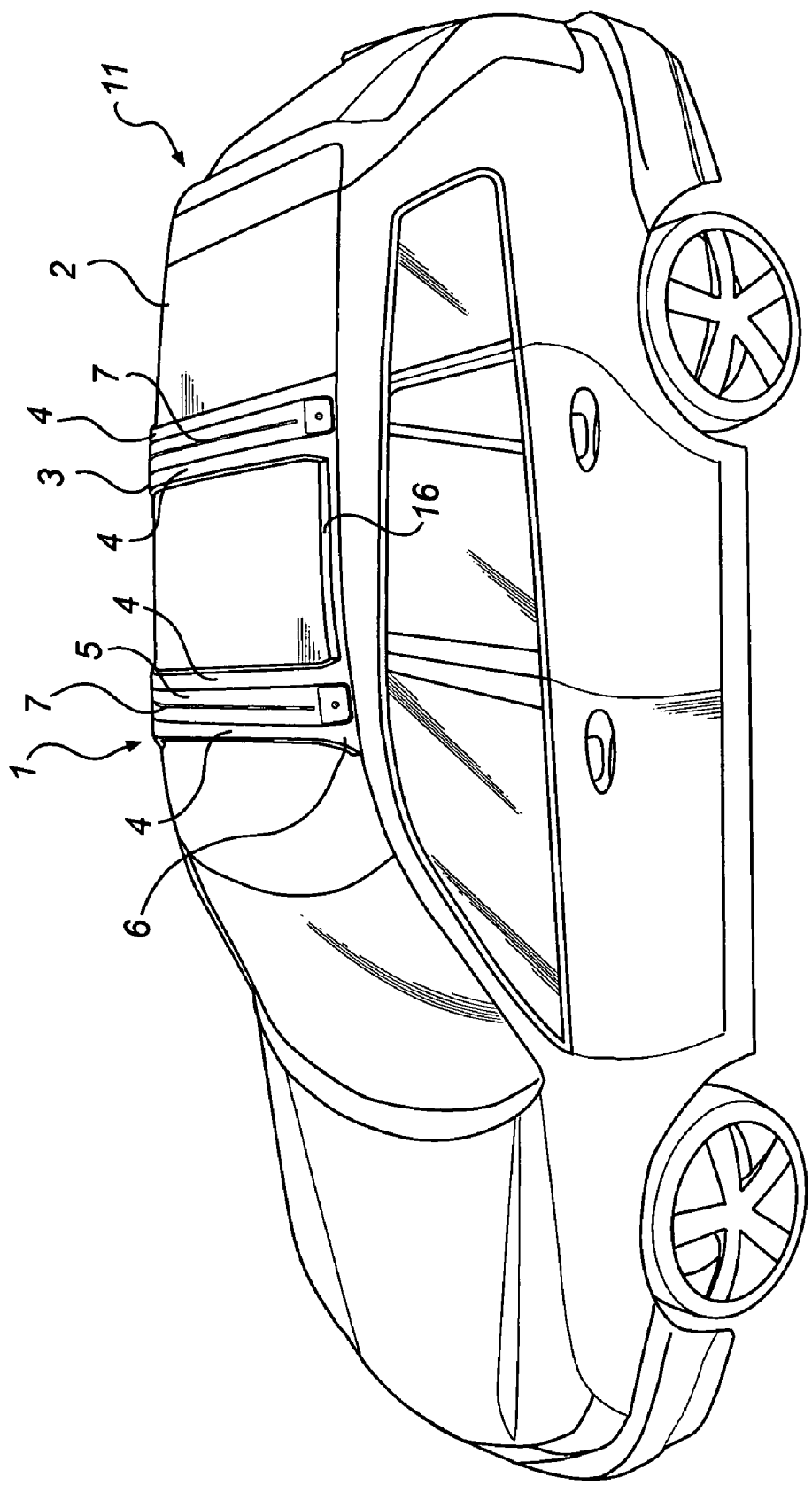
FIG. 1 is a side view obliquely from above of a vehicle with a load carrier according to the present invention.

FIG. 1 shows a car 11 with a roof rack 1 mounted across the vehicle roof 2 relative to the direction of travel of the car 11. The roof rack 1 exemplifies a load carrier 1 according to the present invention and has in FIG. 1 two load profiles 3. The load profiles 3 extend across the vehicle roof 2. Furthermore each load profile 3 comprises a loading bridge 4 and a skid 5 and these components are described in more detail in FIG. 4. The loading bridge 4 is an example of a first part 4 and the skid 5 is an example of a second part 5 according to the present invention. The two load profiles 3 of the roof rack 1 are in their respective longitudinal end portions provided with supports 6. The weight of the roof rack 1 and cargo placed thereon is transferred via the supports 6 down to the car 11. Moreover the supports 6 are used to fix the roof rack 1 to the car 11. In this preferred embodiment of the invention, each load profile 3 and support 6 are designed so as to jointly form an integral unit with a soft transition between them to give the roof rack 1 a less angular and hard design. The two load profiles 3 are positioned at a distance from each other with a fixing bar 16 arranged between them seen in the direction of travel of the car 11 to hold the two profiles 3 at this predetermined distance. Each fixing bar 16 is fixed to the associated support 6. To obtain appreciated design advantages such as an aerodynamic flexible roof rack 1 where the vertical height of the roof rack 1 and any cargo seen from the car roof 2 is minimized, the roof rack 1 is arranged close to the car roof 2. This is favorable, for instance, when passing through low doors, such as garage doors. By close to is meant in this preferred embodiment that the vertically lower surface of the load profiles 3 is positioned at a distance from the car roof 2 of between 0.5 and 5 cm. Of course, the roof rack 1 functions with a smaller or greater distance between its lower side and the car roof 2. However, the intention is that the nearness of the roof rack 1 to the car roof 2 should imply that the roof rack 1 is to be seen as little as possible at a distance. In this manner the design of the car 1 will be allowed to dominate.

The roof rack 1 has the stiffness that is required to carry the maximum load for which the car roof 2 is dimensioned. Since the roof rack 1 is arranged close to the roof 2, it is in the normal case not possible to use, for instance, ropes to fasten cargo to the roof rack 1, but according to the present invention fastening means 7 in the vertically upper surface of the skids 5 are used, which is exemplified in FIG. 5. Moreover the roof rack 1 has been given the same color as the car 11 to provide an esthetically attractive roof rack 1 whose design is compatible with the car 11.

Figure 2:
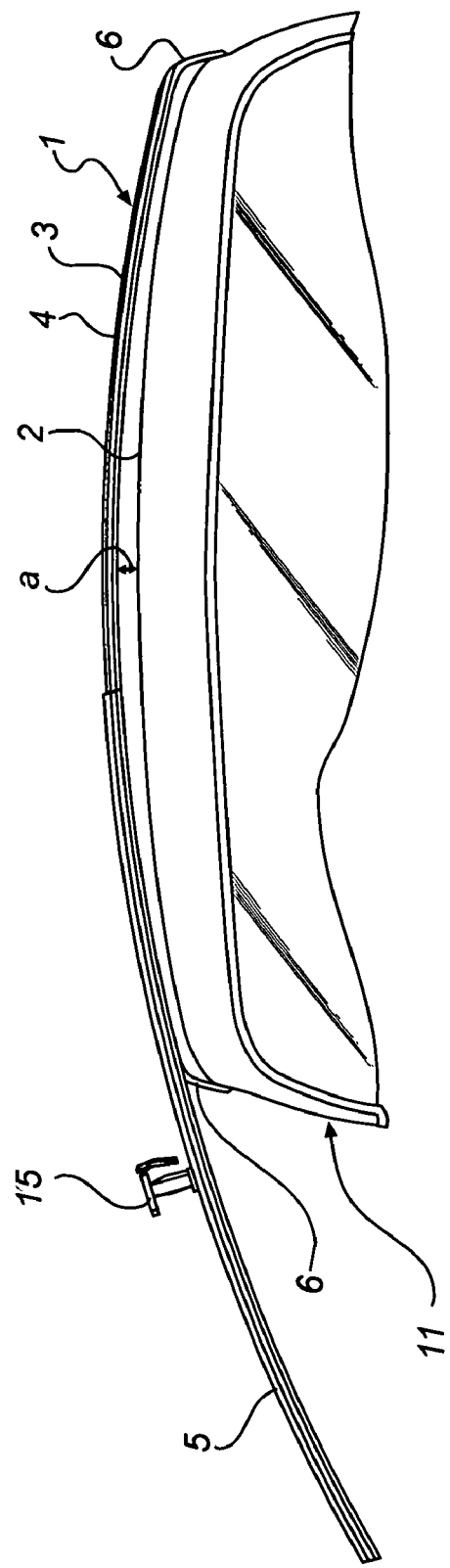
FIG. 2 is a cut view seen from behind of a vehicle roof with a load carrier according to the present invention when the load carrier is prepared for, for example, loading of cargo.

FIG. 2 shows a car roof 2 with a roof rack 1 in a cut view seen from behind when the roof rack 1 is prepared for loading of cargo or exchange of the skid 5. The skid 5 is pulled out to the side of the car 11 in the longitudinal direction of the load profile 3 and the skid 5 to allow the user to stand beside the car 11 and load and unload cargo. The roof rack 1 has in the Figure a circular arc curve, which provides, in one and the same movement of the user, a position movement of the skid 5 in two directions: horizontally across the car roof 2 and vertically downwards to the ground. This makes it smooth and easy for the user to load and unload cargo since he does not have to raise the cargo to the same extent with the skid 5 closer to the ground seen from the car roof 2. When the user has loaded the cargo onto the skid 5, the skid 5 is moved back to the initial position according to FIG. 1 and FIG. 3.

Should the user instead want to exchange the skids 5 for other skids 5, for instance, such having other types of fastening means 7 than those of the first type, the skids 5 are simply completely pulled out of the load profiles 3. This releases the load profiles 3 so that the other type of skids 5 can be inserted. For instance, the fastening means 7 of the skids 5 may in one embodiment be adapted to one or more multipurpose mounts or to specially adjusted mounts 15 such as for bicycle racks, which is illustrated in the Figure.

Figure 3:
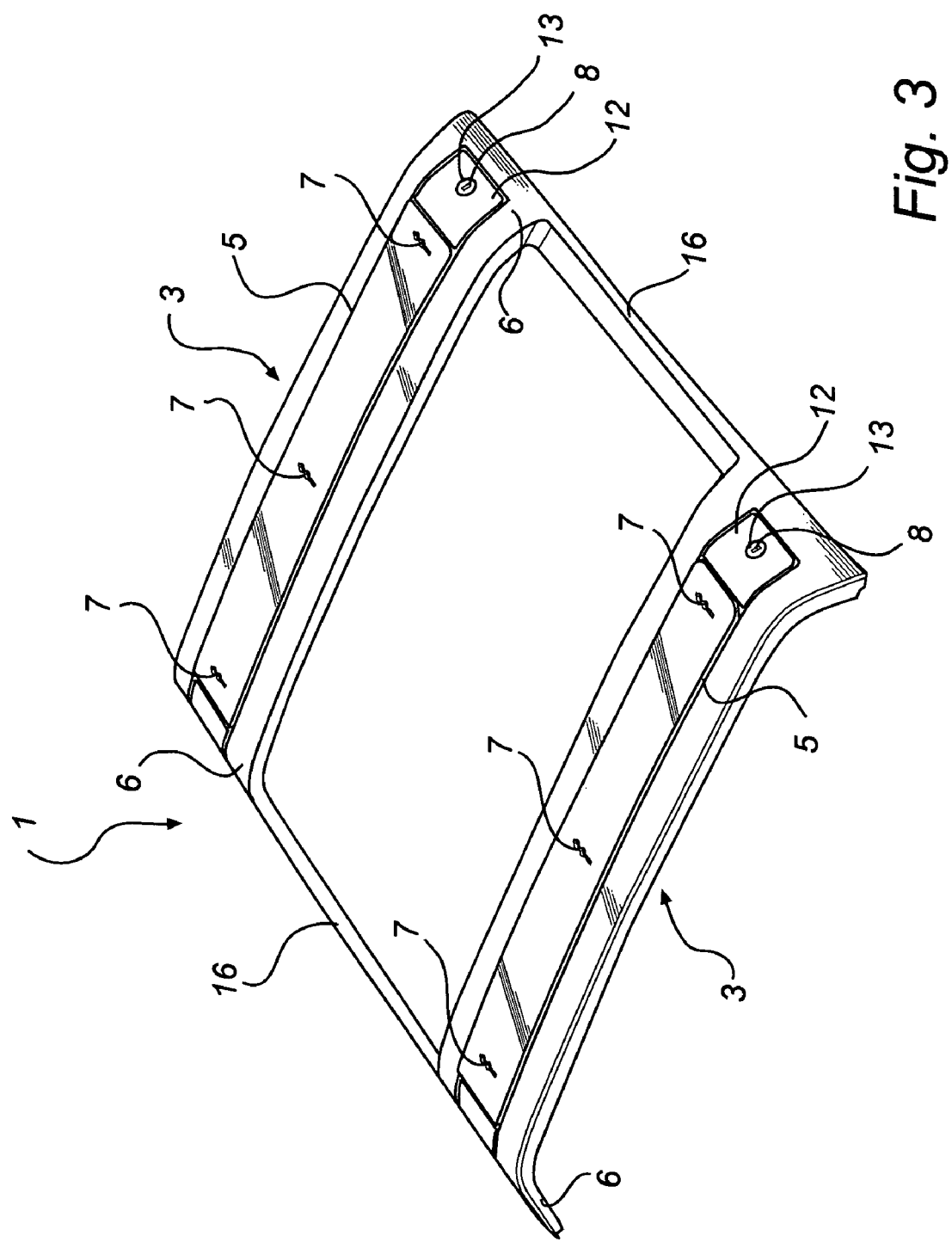
FIG. 3 is a perspective view of a load carrier comprising two load profiles.

FIG. 3 shows a roof rack 1 with two load profiles 3 when the roof rack 1 is positioned in its locked inserted position. When the user has loaded cargo on the roof rack 1 and inserted the skids 5 completely into the load profiles 3, as described above, the user secures the skids 5 in a locked position relative to the roof rack 1. This is provided by the user advancing a locking means 12 so that the skid 5 is prevented from leaving the load profile 3. The locking means 12 is provided with a lock cylinder 13 with a slot 8 into which a key (not shown) fits. The locking means 12 is placed at one end of the load profile 3. In the preferred embodiment, the locking means 12 is retracted into the support 6 to save space. The user turns the key in the lock cylinder 13 for locking so that the locking means 12 locks the skid 5 to prevent it from being pulled out.

The roof rack 1 is fixed to the car 11 via fixing points in, for instance, the doorframes of the car 11, which means that the roof rack 1 is perfectly secured when the car door is closed and locked.

Figure 4:
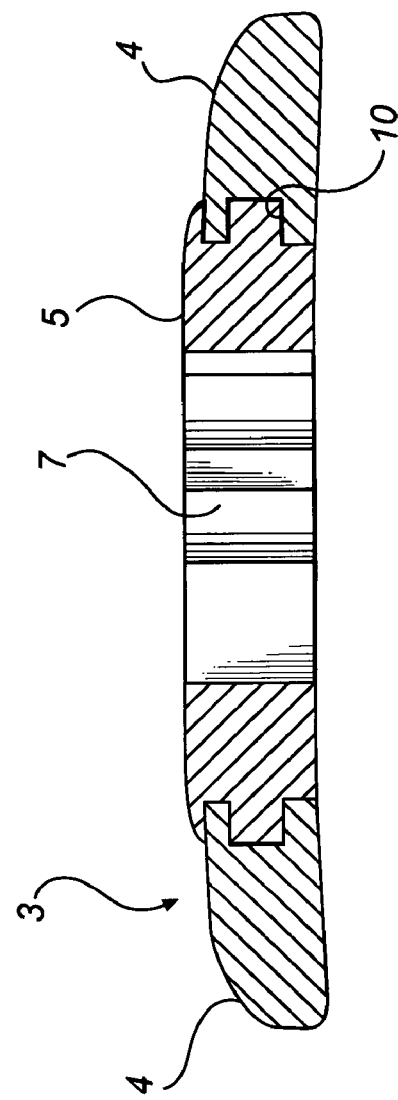
FIG. 4 is a cross-sectional view of a first part and a second part of the load carrier.

FIG. 4 shows in cross-section from the front the load profile 3 with the two parts that constitute the loading bridge 4, and with the skid 5, in the assembled state. The two halves of the loading bridge 4 each comprise an undercut groove 10 which in this preferred embodiment in cross-section can be said to resemble a lying U. In the sense of the patent, undercut groove 10 refers to a groove with a constricted opening. The skid 5 is connected in the undercut groove 10.

The skid 5 consists of a slideway to make it fit into the undercut groove 10 of the loading bridge 4. The skid 5 is adapted to hold and support cargo by fastening means 7 for instance. The skid 5 is made of a sufficiently rigid material to be able to fasten the maximum cargo permissible for the vehicle roof 2 in the undercut groove 10 of the loading bridge 4.

The vertically upper surface of the skid 5 may be positioned slightly above the upper surface of the loading bridge 4 so as to also constitute a wearing surface.

Figure 5:
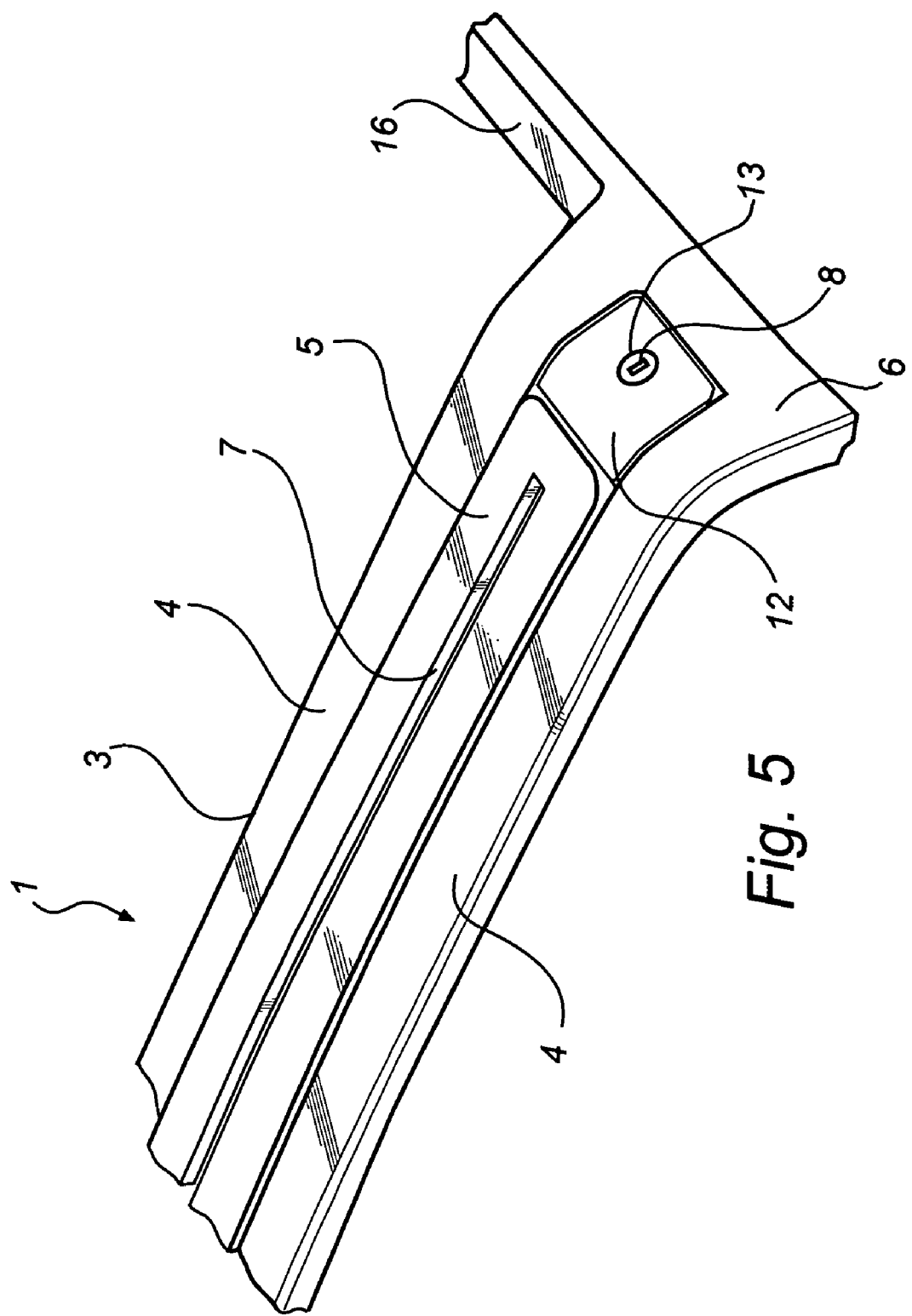
FIG. 5 is a cut perspective view of the second part of the load carrier, comprising fastening means.

FIG. 5 is a cut perspective view of the skid 5 inserted into the loading bridge 4. The skid 5 comprises fastening means 7. In the Figure, the fastening means 7 is also an undercut groove in which cargo is fixed by fixing means (not shown). This undercut groove differs from the undercut groove 10 of the loading bridge 4 and thus has a different purpose. This undercut groove has in cross-section the shape of an inverted T. The fastening means 7 extends along almost the entire length of the skid 5 so as to be capable of supporting as wide pieces of cargo as possible.

Figure 6:
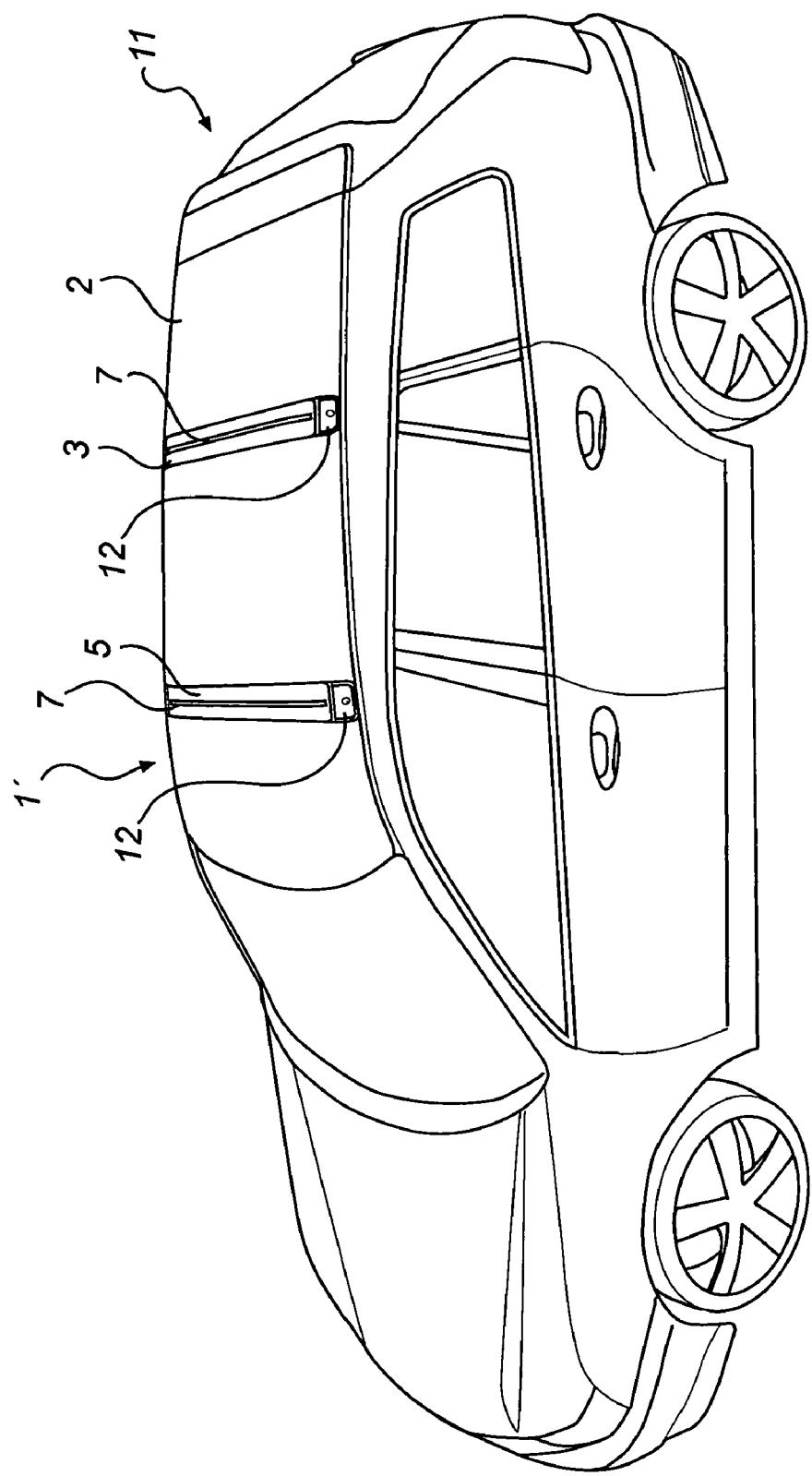
FIG. 6 shows a load carrier according to the present invention integrated with the vehicle roof.

FIG. 6 shows a roof rack 1' which is integrated with the car roof 2 according to another embodiment. This results in a simple and smooth roof rack 1' with a shape and color fully adapted to the roof 2 of the car. In this way the total vertical height of the roof rack 1' and the cargo seen from the car roof is minimized in use, which makes it smooth for the user when passing through, for instance, low doors. In addition, the user always has the roof rack 1' available on the car 11 and does not have to put it on and off as occasion requires. In this embodiment it is possible to conceal the loading bridge 4 as shown in FIG. 6. This can be provided by the roofing sheets of the car 11 being attached adjacent or close to the undercut groove 10. In this embodiment, it is also convenient for the skid 5, in line with the embodiment according to FIG. 4, to be slightly raised above the loading bridge 4/roof 2 so that the cargo loaded thereon does not damage the roof 2. In other respects, this embodiment functions like the one preferred above. However, the properties in terms of noise and aerodynamics will be further improved.

It will easily be appreciated that many modifications of the above-described preferred embodiment are conceivable within the scope of the invention. For example, the car 11 can be replaced by a truck or some other vehicle.

Furthermore the roof rack 1 can be mounted along the car roof 2 relative to the direction of travel of the car 11. The cargo is then suitably loaded onto the car 1 from behind.

It is also possible to have several different types of second parts 5 with different forms of fastening means 7 for simplified use of the load carrier.

The roof rack 1 may comprise one, two, three or more load profiles 3 depending on the field of application.

The skid 5 of the roof rack 1, which skid engages in the undercut groove 10, may in alternative embodiments consist of a plurality of separate slideway means, to which the cargo is attached.

What is claimed is:

1. A load carrier for a vehicle roof, comprising:
at least two load profiles, which in use extends along the vehicle roof, the load profiles each including a fixed first part, having a first half and a second half, and a movable second part movable relative to the first part in their longitudinal direction, the first part including an undercut groove which extends in the longitudinal direction of the first part and in which engages, in a longitudinally displaceable manner, at least one slideway that forms a sidewall of the second part and having a shape matching the undercut groove, wherein
a track formed by the undercut groove includes a circular arc curve with a radius of curvature bent downwards from the arc,
the movable second part is fitted between the first half and the second half of the fixed first part,
end portions of the first part are integrally formed supports that fix the load carrier to the vehicle roof, such that an upper most surface of the first part is contiguous with an outer most surface of the supports,
the two load profiles are positioned at a distance from each other with two fixing bars arranged between them to hold the two profiles at the distance, each fixing bar extending substantially perpendicular to the longitudinal direction of the load profiles and integrally formed at its opposite ends to the supports of the first parts of the two load profiles, and
at a partially extended position of the movable second part, a portion of the vehicle roof is exposed between the first and second halves of the fixed first part.

2. A load carrier as claimed in claim 1, wherein said second part is a slide adapted to the cross-sectional shape of the undercut groove in said first part.

3. A load carrier as claimed in claim 1, wherein said second part is completely extensible from said first part.

4. A load carrier as claimed in claim 1, wherein said second part is a cover profile.

5. A load carrier as claimed in claim 1, wherein said first part is arranged to be permanently connected to the vehicle roof.

6. A load carrier as claimed in claim 1, wherein said first part is integrated with the vehicle roof.

7. A load carrier as claimed in claim 1, wherein a vertically upper side of the at least one load profile substantially follows the roof profile.

8. A load carrier as claimed in claim 1, wherein a vertically upper side of the at least one load profile substantially coincides with the roof profile.

9. A load carrier as claimed in claim 1, wherein the load carrier includes two load profiles.

10. A load carrier as claimed in claim 1, wherein the at least one slideway protrudes along substantially an entire length of the second part.

11. A load carrier as claimed in claim 1, wherein the second part includes a vertically upper surface positioned above an upper surface of the first part, the vertically upper surface constituting a wearing surface.

12. A load carrier as claimed in claim 1, wherein the fixing bars are stationary and are arranged between the two load profiles to hold the two load profiles at the set distance from one another.

13. A load carrier as claimed in claim 1, wherein the at least one load profile is recessed into the vehicle roof and the second part is above the vehicle roof.

14. A load carrier as claimed in claim 1, wherein the longitudinal extent of the at least one load profile is transverse to the vehicle roof.

15. A load carrier as claimed in claim 14, wherein said second part is a slide adapted to the cross-sectional shape of the undercut groove in said first part.

16. A load carrier as claimed in claim 14, wherein said second part is completely extensible from said first part.

17. A load carrier as claimed in claim 14, wherein said second part is a cover profile.

18. A load carrier as claimed in claim 14, wherein said first part is arranged to be permanently connected to the vehicle roof.

19. A load carrier as claimed in claim 1, wherein a vertically upper side of said second part is provided with fastening means for fastening components adapted to a current roof load.

20. A load carrier as claimed in claim 19, wherein the fastening means includes a recess in the vertically upper side of the second part.

21. A load carrier as claimed in claim 1, further comprising locking means retracted into the support and fitted between the first half and the second half of the first part at a longitudinal end of the first part.

22. A load carrier as claimed in claim 21, wherein the locking means provides a longitudinal stop to prevent the second part from leaving the first part.

23. A load carrier for a vehicle roof, comprising:

at least two load profiles, each load profile including:

a stationary loading bridge having a first half and a second half, each of the first half and the second half having a groove therein;

a movable skid having a slideway on opposing sides thereof, the skid being fitted between the first half and the second half of the loading bridge, wherein the slideway on each of the opposing sides of the skid engages in a respective groove in the loading bridge, and a track formed by the groove includes a circular arc curve with a radius of curvature bent downwards from the arc, end portions of the stationary loading bridge are integrally formed supports that fix the load carrier to the vehicle roof, such that an upper most surface of the stationary loading bridge is contiguous with an outer most surface of the supports, two fixing bars extending substantially perpendicular to the longitudinal direction of the load profiles and being integrally formed at their opposite ends with the supports of the two load profiles to keep the two load profiles at a predetermined distance from each other, and at a partially extended position of the movable skid, a portion of the vehicle roof is exposed between the first and second halves of the stationary loading bridge.

24. A load carrier as claimed in claim 23, wherein said skid is a cover profile that includes a portion that overlaps the loading bridge.

* * * * *